United States Patent Office 2,704,695
Patented Mar. 22, 1955

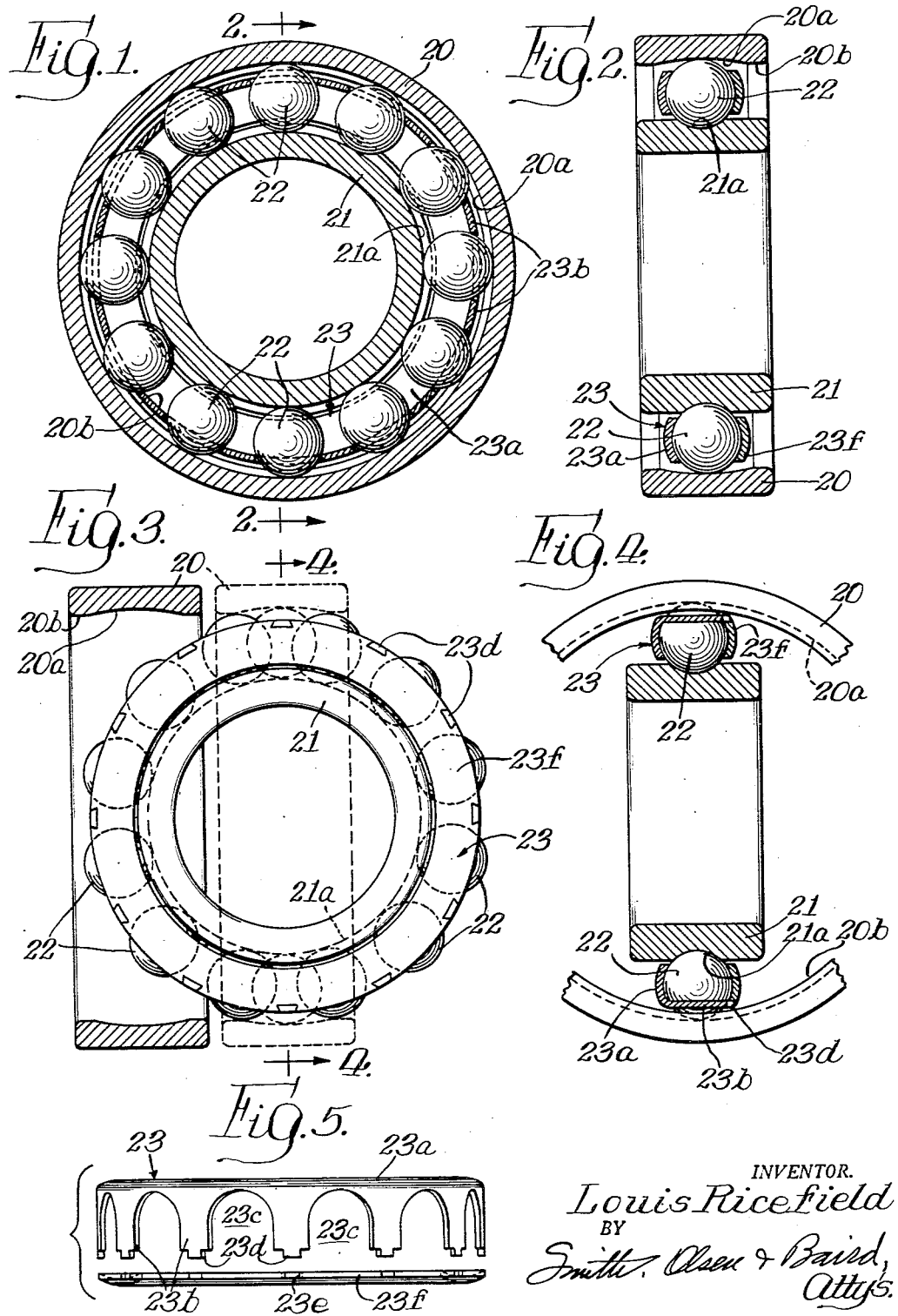

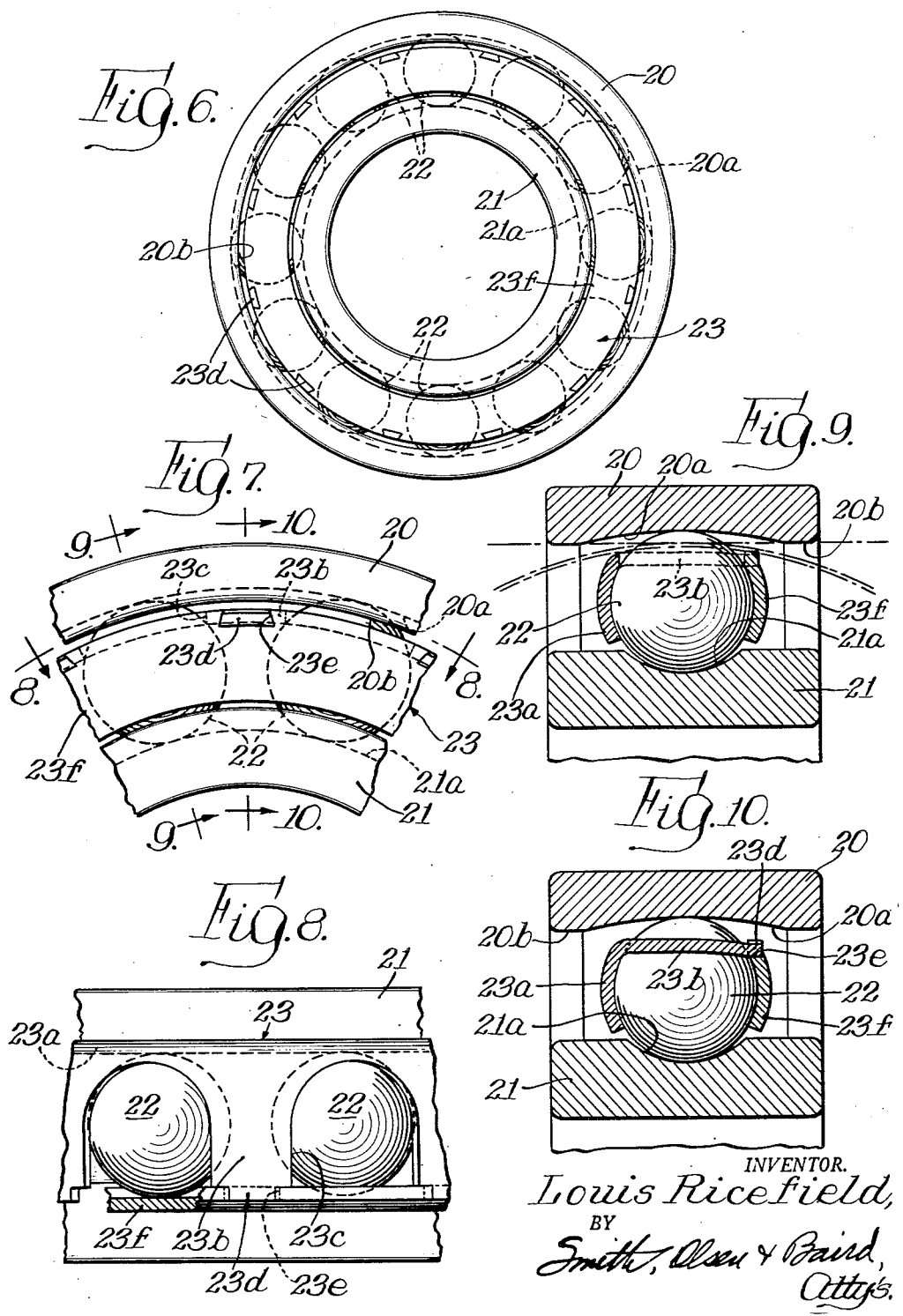

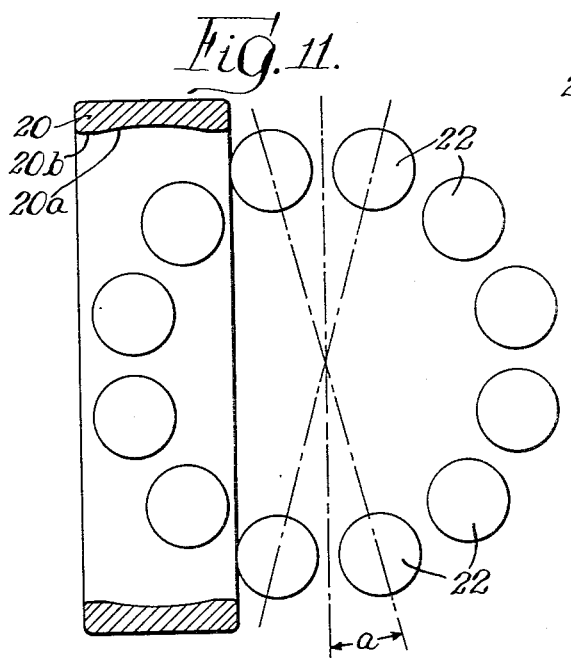
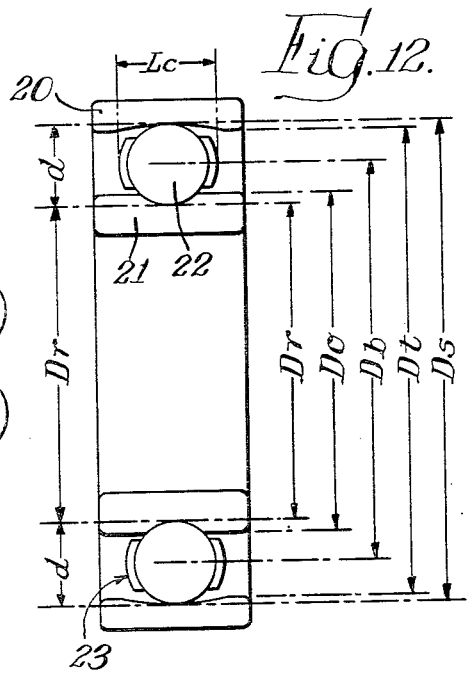
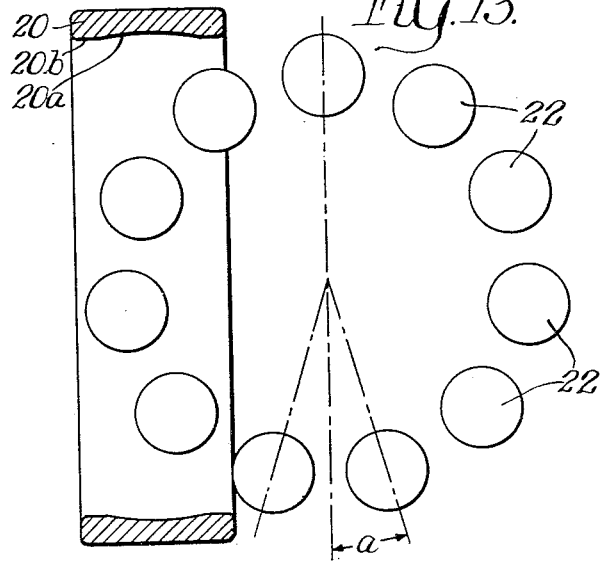

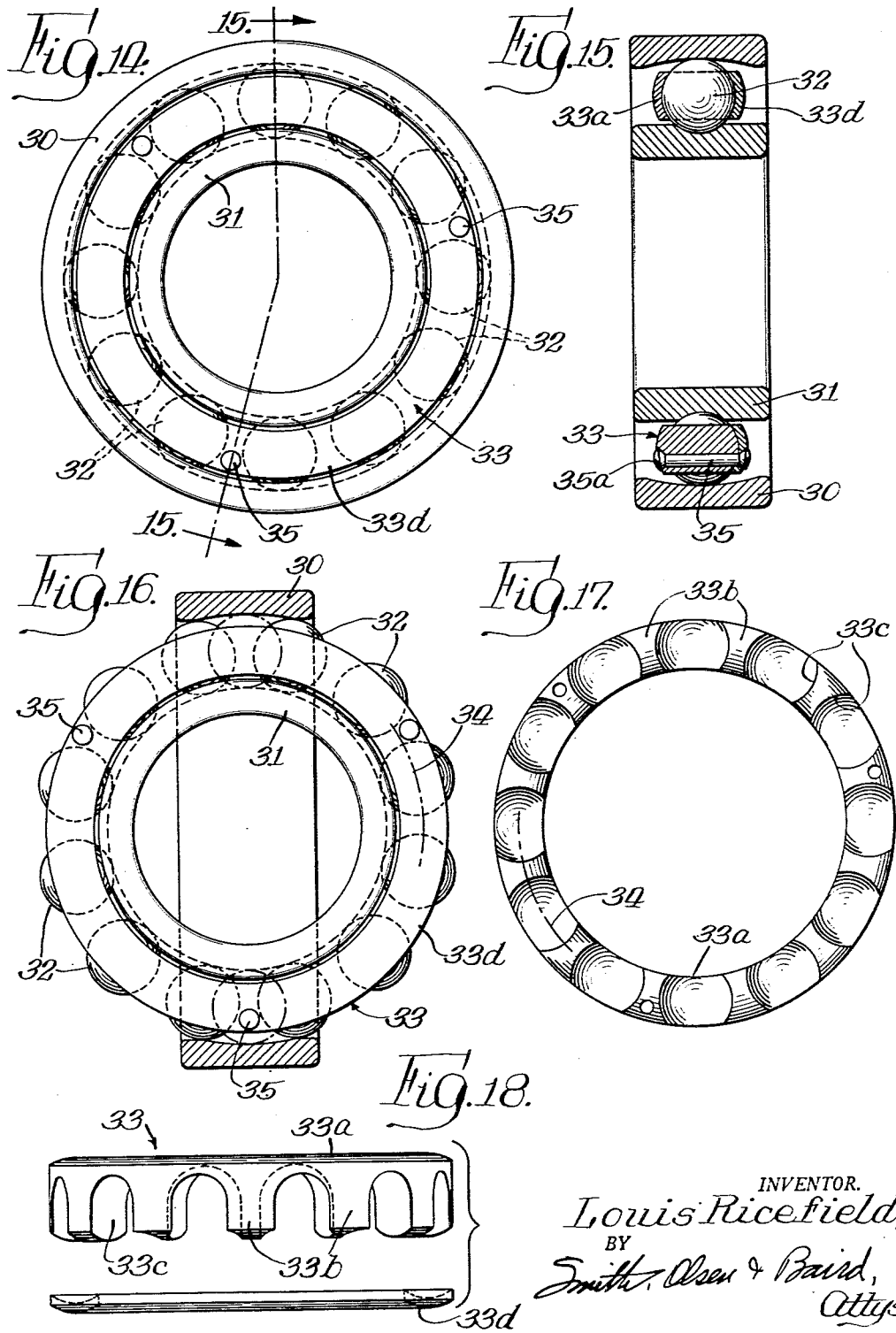

2,704,695

SELF-ALIGNING BEARINGS

Louis Ricefield, Oak Park, Ill.

Application July 3, 1951, Serial No. 234,969

5 Claims. (Cl. 308—194)

This invention relates to improvements in self-aligning bearings and to methods of assembly of the parts thereof whereby the construction of such bearings is simplified and their cost of manufacture is reduced.

A self-aligning bearing commonly comprises inner and outer rings or sleeves having opposed annular grooves or raceways which are engaged by one or more annular series of bearing balls retained in operative relation to each other by an annular frame or cage having sockets or recesses in which the balls are positioned. The assembly of such a bearing has heretofore presented a considerable problem. According to the former practice, the inner ring and the cage, with all but one or two of the balls inserted therein, have been placed in the outer ring with the planes of the two rings at right angles to each other. The cage is then turned to make the recesses for the missing balls accessible, whereupon the lugs of the cage which normally hold these balls in proper relation to the inner ring are bent outwardly to permit the insertion of the missing balls and, after these balls have been placed in position, the lugs are bent back to their normal positions. The inner ring and the cage and balls may then be rotated into the plane of the outer ring. The method just described is tedious and time consuming and has the disadvantage that the ball retaining lugs of the cage have to be made of substantial width to withstand the necessary bending operations and this reduces the number of balls which may be embodied in the bearing. Since the capacity of such a bearing varies with the square of the diameter of the balls and with the number of balls, it is desirable to use large balls and as many balls as possible, that is, a complete annular series of balls spaced from each other only by slight working clearances.

The present invention is based upon the discovery that, if the rings and the cage be properly proportioned and the balls be properly located, the inner ring with the complete maximum number of balls assembled thereon may be inserted in the outer ring by locating the inner ring in a plane at right angles to the plane of the outer ring, thrusting the inner ring and the balls into the outer ring, and then effecting relative rotation of the two rings until they are in the same plane. Assuming that the parts are properly proportioned, and that the rings have been located in right-angular planes, the assembly requires the operations of rotating the inner ring until two of the balls adjacent to and equidistant from a radial center line of the inner ring which is parallel to a radial center line of the outer ring, with a line tangent to their outer surfaces extending parallel to the axis of the outer ring and tangent to the innermost surfaces of the outer ring, and then thrusting the inner ring into the outer ring until the aforesaid radial center line of the inner ring is coincident with said radial center line of the outer ring, whereupon the two rings are relatively rotated into the same plane.

The method of assembly just described may most conveniently be performed by using an even number of balls since the distance between two lines tangent to two spaced balls at opposite sides of the ring is less than the distance between one such line tangent to two balls and the outermost position of the surface of a single ball located at the opposite side of the inner ring in a radial plane located midway between said two balls. However, the method of assembly is operable with either an even number or an odd number of balls and, in either case, has marked advantages over the methods heretofore employed. In order to carry out the method of assembly of the present invention the dimensions of the parts must be predetermined within certain limits according to the method hereinafter described. Further objects of the invention are to provide an improved cage for a ball bearing and to provide an improved self-aligning bearing.

The various objects and advantages of the invention will appear more fully from the following specification taken with the accompanying drawings in which three structural embodiments of the invention and certain examples of the method of assembly are illustrated and described. In the drawings, Figure 1 shows a central transverse section through a form of bearing embodying the present invention taken normally to the axis thereof;

Fig. 2 shows a sectional view taken on the line 2—2 of Fig. 1;

Fig. 3 shows the inner ring and the cage of the bearing illustrated in Fig. 1 with the balls assembled in the cage and with the inner ring at right angles to the plane of the outer ring in readiness to be inserted therein, the relation of the balls to the outer ring at the time of insertion being illustrated by a dotted representation of the outer ring;

Fig. 4 shows a vertical section through the inner ring and the cage illustrated in Fig. 3 with the outer ring partially illustrated in elevation, the section being taken on the line 4—4 of Fig. 3;

Fig. 5 shows a plan view of the cage illustrated in Figs. 1 to 4, inclusive, with one wall of the cage removed;

Fig. 6 shows a side elevation of the assembled bearing illustrated in Figs. 1 and 2;

Fig. 7 shows an enlarged partial side elevation of a portion of the bearing illustrated in Figs. 1, 2 and 6;

Fig. 8 shows a section taken on the line 8—8 of Fig. 7, illustrating two of the balls and a portion of the cage in plan view;

Fig. 9 shows a sectional view taken on the line 9—9 of Fig. 7;

Fig. 10 shows a sectional view taken on the line 10—10 of Fig. 7;

Fig. 11 shows a skeleton view similar to that of Fig. 3 with an indication by symbols of certain measurements of the bearing;

Fig. 12 shows a skeleton sectional view similar to that of Fig. 2, illustrating the symbols by which the measurements of the bearing are identified;

Fig. 13 shows a skeleton view similar to that of Fig. 3 when an odd number of balls are mounted in the cage;

Fig. 14 shows a side elevation of a modified form of bearing embodying the present invention;

Fig. 15 shows a sectional view taken on the line 15—15 of Fig. 14;

Fig. 16 shows a sectional view of the outer ring of the bearing illustrated in Fig. 14 with the inner ring, the cage and the assembled balls occupying a position in a plane at right angles to the plane of the outer ring, thus illustrating the relative positions of the parts in the process of assembly preliminary to rotating the inner ring into the plane of the outer ring;

Fig. 17 shows a side elevation of the cage embodied in the form of construction illustrated in Figs. 14, 15 and 16; and Fig. 18 shows a plan view of the cage illustrated in Fig. 17 with one side wall thereof removed.

The form of the invention illustrated in Figs. 1 to 13, inclusive, comprises a substantially cylindrical outer ring 20 which surrounds a substantially cylindrical inner ring 21 adapted to fit upon a shaft to be supported by the bearing. The rings 20 and 21 are separated by an annular series of spherical balls 22, formed of hard metal, which fit an annular groove 21a formed in the inner ring and which are adapted to revolve within an annular raceway 20a which is formed in the outer ring. The balls 22 are held in assembled relationship and are spaced apart by a cage 23 which comprises an annular wall 23a located in a radial plane and having formed integrally therewith a plurality of transversely extending arms 23b which provide a series of equally spaced slots 23c, each of which receives one of the balls 22. The arms 23b form segments of a cylinder and they are provided at their outer ends with projecting extremities 23d which fit apertures 23e formed in a removable side wall 23f. The side wall 23f occupies a radial plane and is similar in construction to the parallel wall 23a. When the projections 23d are inserted in the apertures 23e, their ends may be reverted to hold the wall 23f in assembled relationship to the other parts of the cage. With this construction, the balls 22 are free to revolve within the annular groove or raceway 21a and are also free to revolve in the raceway 20a of the outer ring. The surface 20a is formed as a segment of a spherical surface which permits movement thereon of the balls 22 transversely of the plane of the ring 20 so that the inner ring 21 and the shaft on which it is mounted are free to align themselves in proper relationship to other parts or devices which may be connected to the shaft.

In the construction shown in Figs. 1, 2, 3, 6 and 11, the bearing is provided with an even number of balls, namely, twelve balls, which are spaced equal distances apart and if the inner ring and the cage with the assembled balls be located in a plane at right angles to the plane of the outer ring 20, as shown in Figs. 3 and 11, with two of the balls at the top and the bottom of the inner ring spaced equally from a vertical plane passing through the axis of the inner ring, the distance between two lines which are tangent to the outermost surfaces of these two pairs of balls will be less than the distance between the inner marginal edges 20b of the outer ring, as indicated by the dotted representation of the outer ring 20 in Fig. 3. Thus, with the parts in this position, the inner ring and the cage with the assembled balls may be moved laterally toward the left from the position shown in Fig. 3 until the two pairs of balls at the upper and lower sides of the inner ring are positioned slightly within the spherical raceway 20a of the outer ring, a condition which is also represented by the dotted line indication of the outer ring in Fig. 3. After the inner ring and the assembled balls have moved to this position they may be rotated about a vertical axis until the inner ring lies within the plane of the outer ring and all of the balls occupy positions within the annular raceway 20a. The assembly is then completed and the inner ring with the assembled balls are free to revolve within the outer ring and are restrained from lateral movement from the outer ring by reason of the fact that the normal distance between two oppositely disposed balls is greater than the distance between the marginal edges 20b of the outer ring.

In order that the parts of the bearing shown in Figs. 1, 2, 3 and 11 may be assembled in the manner which has just been described, it is necessary that the parts be properly proportioned to allow for the insertion of the inner ring and the assembled balls without interference by the marginal edges 20b of the outer ring and to permit the rotation of the inner ring and the balls within the outer ring without interference with the outer ring by the cage 23 by which the balls are held in assembled relationship. These requirements impose some limitations upon the axial length of the outer ring and the consequent extent of the annular spherical surface 20a, in addition to imposing limitations upon the dimensions of the cage 23 and upon the size of the balls which may be employed with a particular construction of the rings and of the cage.

The consideration of the dimensions of the parts of the bearing may best be understood by reference to Figs. 7 to 13, inclusive, in some of which various dimensions are designated by certain of the symbols used hereinafter, as follows:

$n$ = number of balls 22
$d$ = diameter of balls 22
$s$ = spacing of balls on pitch circle
$Dr$ = root diameter of inner groove or raceway 21a
$Do$ = outside diameter of inner ring 21
$Db$ = pitch diameter of balls = $Dr+d$
$Ds$ = diameter of spherical surface 20a
$Dt$ = throat diameter of outer race at the margin 20b of the surface 20a
$Dc1$ = outer diameter of cage 23, at ends
$Dc2$ = inner diameter of cage 23
$Lc$ = axial length of cage
$w$ = thickness of the walls of cage 23
$a$ = angle between vertical plane passing through axis of inner ring and a radius of that ring passing through center of adjacent ball (see Fig. 11)

Referring to the drawings, it will be seen that the diameter of the outer raceway 20a is derived from the equation $$Ds = Dr + 2d + k$$

where $k$ is a constant representing a small operating clearance. If the root diameter of the inner raceway, $Dr$, be taken as 1.224 inches and balls be selected having a diameter of 0.3125 inch and $k$ be taken as 0.001 inch, then $$Ds = 1.224 + 0.6250 + 0.001 = 1.850 \text{ inches}$$

The inner diameter $Dt$ of the outer ring, which determines the clearance available for admitting the inner ring and the balls, is determined for an even number of balls from the equation $$Dt = Db \cdot \cos a + d + k_1$$

where $Db$, the pitch diameter of the balls is equal to $Dr$ plus $d$, $a$ is equal to 360 degrees divided by twice the number of balls (see Fig. 11) and $k_1$ is a constant added for clearance, for example, 0.003 inch. Thus, with twelve balls, $$Dt = (1.224 + 0.3125) \cdot \cos 15° + 0.3125 + 0.003 = 1.800 \text{ inches}$$

If it be assumed that an odd number of balls be used, as represented in Fig. 13, the throat diameter $Dt$ of the outer raceway will be determined from the equation $$Dt = \frac{Db}{2} \cdot (\cos a + 1) + d + k$$

thereby providing a somewhat larger dimension for the diameter of the throat of the outer ring to accommodate the larger effective diameter of the odd numbered series of balls at the time of their insertion into the outer ring.

It is also necessary to determine the dimensions of the cage in order to permit the cage and the balls to be rotated from the position shown in Fig. 4 to the position shown in Fig. 2, without interference by the outer ring 20. The length $Lc$ of the cage is equal to the diameter of the balls plus twice the thickness of the wall of the cage. If $d$ be taken as 0.3125 inch and $w$ as one thirty-second of an inch, then $$Lc = 0.3125 + 0.0625 + k_2 = 0.376 \text{ inch}$$

where $k_2$ is a constant given a value of 0.003 inch for clearance.

The outside diameter of the cage at its ends is determined by the equation $$Dc1 \leqq \sqrt{Dt^2 - Lc^2}$$

For an even number of balls, $$Dc1 \leqq \sqrt{\left(Db \cdot \cos \frac{360}{2n} + d\right)^2 - (d+2w)^2}$$

For an odd number of balls, $$Dc1 \leqq \sqrt{\left[\frac{Db}{2} \cdot \left(\cos \frac{360}{n} + 1\right) + d\right]^2 - (d+2w)^2}$$

With the values for the other dimensions in this equation previously used or calculated, $Dc1 = 1.757$ inches for an even number of balls.

The inside diameter of the cage $Dc2$ is not critical but should be slightly greater than $Do$, the outside diameter of the inner ring. The outer periphery of the cage may be generally cylindrical with a diameter $Dc1$ or $Dc2$ but if it be desirable to increase its outside diameter in the central plane passing through the axes of the balls, this may be done within the limits of the throat diameter $Dt$ of the outer ring except that a few thousandths of an inch clearance should be provided to permit freedom of movement of the cage and balls with respect to the outer ring during assembly.

The spacing of the centers of the balls 22 on the pitch circle or annular center line of the balls is determined by the formula $$s = (Dr + d) \sin \frac{360}{2n}$$

which with the dimensions of $Dr$, $d$ and $n$ given above equals 0.3978 inch. The gap between two adjacent balls will then be 0.3978 minus 0.3125 = 0.0853 inch. This is ample spacing to permit the passage of the arms 23b of the cage between the outer portions of the balls and also to permit the passage of other fastening means between the radial walls of the cage as in the embodiment hereinafter described. Thus the present invention permits the use of the maximum number of balls between the inner and outer rings while providing ample working clearance between adjacent balls whether or not the bearing is misaligned.

In Figs. 14 to 18, inclusive, of the drawings, there is shown a modification of the invention which is similar to that which has been described except for the construction of the cage. This form of bearing comprises an outer ring 30, an inner ring 31, an annular series of balls 32 and a cage 33. The cage comprises an annular end wall 33a which is curved radially to conform to the curvature of the balls and which has formed integrally therewith a plurality of spacing arms 33b, each arranged to extend between two balls. The arms 33b extend radially on opposite sides of the pitch circle 34 of the balls and each arm has curved surfaces 33c on its opposite sides which conform to the curvature of the balls 32. The cage 33 also comprises another annular end wall 33d which is secured to the free ends of the spacing arms 33 by a plurality of rivets 35 or other fastening devices which pass through registering apertures in the wall 33d and in the spacing arms and the wall 33a, as shown particularly in Fig. 15. If rivets are employed, according to the preferable practice, their ends are upset in the enlarged cavities at the ends of the apertures as shown at 35a. The rivets 35 are preferably located on the outside of the pitch circle 34 of the balls where the spacing arms 33b have ample area even though a maximum number of closely spaced balls are employed. The arms 33b thus serve not only to space the balls apart but also to provide bearing surfaces for them. The balls are free to roll between the spacing arms, whether the bearing is misaligned or not, and the spacing arms are fixed between the end walls of the cage and strong enough to resist centrifugal and tangential forces which may be produced by the crowding of the balls under load.

The parts of the bearing shown in Figs. 14 to 18, inclusive, may be assembled in the manner heretofore described and their dimensions may be calculated in the same way, to provide such relative proportions that the inner ring and the balls mounted in the cage may be inserted into or removed from the outer ring when they have been turned into a plane at right angles to the plane of the outer ring, as shown in Fig. 16, with the balls of two pairs at the top and bottom of the inner rings at equal distances from a vertical plane containing the axis of the inner ring. Of course, a procedure like that previously described may be followed when the cage contains an odd number of balls.

Although two forms of bearing embodying the present invention have been illustrated and described in connection with the description of the new method of assembly, it will be understood that both the structure and the method may be modified within the scope of the appended claims. In the claims, where a dimension is referred to as being "slightly" greater than another dimension, it is intended to refer to a working clearance, such as one or several thousandths of an inch, for example.

I claim:

1. A self-aligning bearing comprising, an inner ring adapted to fit on a shaft and provided on its outer side with an annular raceway, a maximum number of bearing balls mounted in said raceway and spaced slightly and equally apart, an annular cage for holding said balls in assembled relationship and spacing them apart, and an outer ring having an inner annular raceway of such transverse curvature as to permit the travel of said balls transversely thereof to effect the alignment of said shaft, the diameter of said last named raceway being slightly greater than the diameter of said first named raceway plus twice the diameter of said balls, and the inner diameter of said outer ring at its throat being slightly greater than the distance along a plane containing the axis of said inner ring between two lines which are tangential to the outermost parts of two pairs of balls at opposite sides of the axis of said inner ring which are equidistant from and nearest to said plane with the balls of each pair on opposite sides of said plane and with all of said balls spaced equally apart by said cage for normal operation.

2. A self-aligning bearing comprising, an inner ring adapted to fit on a shaft and provided on its outer side with an annular raceway, a maximum number of bearing balls mounted in said raceway and spaced slightly and equally apart, an annular cage for holding said balls in assembled relationship and spacing them equally apart, and an outer ring having an inner annular raceway of such transverse curvature as to permit the travel of said balls transversely thereof to effect the alignment of said shaft, the diameter of said last named raceway being slightly greater than the diameter of said first named raceway plus twice the diameter of said balls, and the inner diameter of said outer ring at its throat being slightly greater than the distance along a plane containing the axis of said inner ring between two lines which are tangential to the outermost parts of two pairs of balls at opposite sides of the axis of said inner ring which are equidistant from and nearest to said plane with the balls of each pair on opposite sides of said plane and with all of said balls spaced equally apart by said cage for normal operation, said cage having an outer diameter at its outer edges sufficiently small to allow the turning of said inner ring and said cage into a plane at right angles to the plane of said outer ring with said shaft removed.

3. A self-aligning bearing comprising, an inner ring adapted to fit on a shaft and provided on its outer side with an annular raceway, a maximum number of bearing balls mounted in said raceway and spaced slightly and equally apart, an annular cage for holding said balls in assembled relationship and spacing them equally apart, and an outer ring having an inner annular raceway of such transverse curvature as to permit the travel of said balls transversely thereof to effect the alignment of said shaft, the diameter of said last named raceway being slightly greater than the diameter of said first named raceway plus twice the diameter of said balls, and the inner diameter of said outer ring at its throat being slightly greater than the distance along a plane containing the axis of said inner ring between a line which is tangential to the outermost parts of two balls which are equidistant from and nearest to said plane on opposite sides thereof at one side of the axis of said inner ring and the outermost part of a single ball located with its axis in said plane at the opposite side of the axis of said inner ring.

4. A self-aligning bearing comprising, an inner ring adapted to fit on a shaft and provided on its outer side with an annular raceway, a maximum number of bearing balls mounted in said raceway and spaced slightly and equally apart, an annular cage for holding said balls in assembled relationship and spacing them equally apart, and an outer ring having an inner annular raceway of such transverse curvature as to permit the travel of said balls transversely thereof to effect the alignment of said shaft, the diameter of said last named raceway being slightly greater than the diameter of said first named raceway plus twice the diameter of said balls, and the inner diameter of said outer ring at its throat being slightly greater than the distance along a plane containing the axis of said inner ring between a line which is tangential to the outermost parts of two balls which are equidistant from and nearest to said plane on opposite sides thereof at one side of the axis of said inner ring and the outermost part of a single ball located with its axis in said plane at the opposite side of the axis of said inner ring, said cage having an outer diameter at its outer edges sufficiently small to allow the turning of said inner ring and said cage into a plane at right angles to the plane of said outer ring with said shaft removed.

5. The method of forming and assembling a self-aligning bearing comprising, an inner ring, a series of balls, a cage and an outer ring, which comprises the steps of forming an outer raceway on said inner ring, mounting a complete annular operating series of balls in said cage and in said raceway, forming said outer ring with an inner spherical bearing surface and with a throat diameter at the edge of said surface slightly greater than the distance measured on a plane containing the axis of said inner ring between two lines which are normal to said plane and tangential to the outermost parts of two pairs of balls which are nearest to and equidistant from said plane on opposite sides of the axis of said inner ring, locating said inner ring in a plane at right angles to the plane of said outer ring with said first mentioned plane parallel to the plane of said outer ring, then moving said inner ring with said cage and said complete series of balls into said outer ring until said first mentioned plane is midway between the lateral edges of said spherical bearing surface, and then effecting a relative rotation of said rings until said inner ring is in the plane of said outer ring.

References Cited in the file of this patent

UNITED STATES PATENTS

| | | |
|---|---|---|
| 937,153 | Karcher | Oct. 19, 1909 |
| 1,115,124 | Starin | Oct. 27, 1914 |
| 1,124,481 | Long | Jan. 12, 1915 |
| 1,281,244 | Pruyn | Oct. 8, 1918 |
| 1,906,259 | Gibbons | May 2, 1933 |
| 1,982,347 | Large | Nov. 27, 1934 |

FOREIGN PATENTS

| | | |
|---|---|---|
| 45,460 | Sweden | Feb. 17, 1916 |
| 190,083 | Great Britain | Dec. 14, 1922 |
| 117,208 | Switzerland | Jan. 3, 1927 |